United States Patent
Wong et al.

(10) Patent No.: US 8,985,305 B2
(45) Date of Patent: Mar. 24, 2015

(54) VIBRATION FEEDING APPARATUS AND METHOD

(75) Inventors: Ho Chi Wong, Kwai Chung (HK); Ping Kong Choy, Kwai Chung (HK); Chung Yin Lau, Kwai Chung (HK); Xiao Feng Li, Kwai Chung (HK)

(73) Assignee: ASM Technology Singapore Pte Ltd, Singapore (SG)

( * ) Notice: Subject to any disclaimer, the term of this patent is extended or adjusted under 35 U.S.C. 154(b) by 95 days.

(21) Appl. No.: 13/593,606

(22) Filed: Aug. 24, 2012

(65) Prior Publication Data

US 2014/0054132 A1 Feb. 27, 2014

(51) Int. Cl.
*B65G 47/256* (2006.01)
*B65G 27/04* (2006.01)
*B65G 47/14* (2006.01)

(52) U.S. Cl.
CPC ............ *B65G 47/256* (2013.01); *B65G 27/04* (2013.01); *B65G 47/1421* (2013.01)
USPC ...................... 198/383; 198/397.06; 198/398

(58) Field of Classification Search
CPC ................................................. B65G 47/256
USPC ...................... 198/752.1, 757, 383
See application file for complete search history.

(56) References Cited

U.S. PATENT DOCUMENTS

| | | | | |
|---|---|---|---|---|
| 3,556,282 A | * | 1/1971 | Moeltzner et al. | 198/397.01 |
| 4,778,043 A | * | 10/1988 | Sticht | 198/389 |
| 5,143,506 A | * | 9/1992 | Sticht | 414/421 |
| 6,216,845 B1 | * | 4/2001 | Polese | 198/398 |
| 6,513,644 B1 | | 2/2003 | Takahashi et al. | |
| 6,860,379 B2 | * | 3/2005 | Matsuda et al. | 198/550.1 |
| 7,111,740 B2 | * | 9/2006 | Ogawa et al. | 209/539 |
| 7,810,632 B2 | * | 10/2010 | Ohashi | 198/720 |
| 2004/0151364 A1 | * | 8/2004 | Kenneway et al. | 382/152 |

* cited by examiner

*Primary Examiner* — Gene Crawford
*Assistant Examiner* — Thomas Randazzo
(74) *Attorney, Agent, or Firm* — Ostrolenk Faber LLP

(57) ABSTRACT

A vibration feeding apparatus comprises an alignment track that is operative to receive electronic components and to arrange the electronic components in a desired orientation by vibrating and accelerating the electronic components located on the alignment track. An inspection station rejects electronic components that are not in the desired orientation onto a reject track for reintroduction to the alignment track. A spreading unit adjacent to the alignment track then transfers rejected electronic components from the reject track to the alignment track for arranging the electronic components in the desired orientation.

20 Claims, 4 Drawing Sheets

VIBRATION FEEDING APPARATUS AND METHOD

FIELD OF THE INVENTION

The invention relates to the feeding of electronic components in bulk, and in particular, to the conveyance and feeding of electronic components by using vibration means.

BACKGROUND AND PRIOR ART

A vibration feeding apparatus typically comprises a container in the form of a rotary vibration bowl and a linear feeder in the form of a vibratory track. They can be found in industry for conveying and orienting components, for instance electronic components, which are delivered in bulk to the vibration feeding apparatus during mass production. They are different from belt conveyers in that vibratory feeding apparatus use small vibrations to transfer components in a step-wise manner. Due to its simplicity and lack of moving mechanical parts, the vibratory feeding apparatus can provide a cleaner and more reliable way of conveying small components. Thus, there are large numbers of vibratory feeding apparatuses developed for conveying small components in different industries.

A vibration feeding apparatus generally involves four main mechanical modules: a bowl or track for orientation and sorting, a hopper for refilling the bowl or track, linear and/or rotary vibrator modules for exciting the bowl, track and/or hopper to vibrate, and a platform for vibration isolation.

The linear or rotary vibrator module generally excites the bowl or track to undergo vibration with a single frequency. The vibrator module comprises a movable block that transmits vibration to the bowl or track, an actuator that provides excitation forces to the movable block, and a spring-mass system that determines the vibration frequency of the vibrator and the conveyance direction. The vibrator module may include an electromagnetic solenoid, such that the force-displacement relationship of the vibrator module is non-linear in nature. The force from the solenoid accelerates the bowl or track to vibrate and the components placed on the bowl or track experience acceleration. The resultant acceleration has both vertical and horizontal components. When the vertical acceleration field is slightly larger than the gravitational field, the components are lifted off the bowl or track surface and are projected forward due to the horizontal acceleration component.

The vibration feeding system also comprises a vibratory bowl container. There are helical chute grooves inside this container for conveying electronic components from a bottom of the bowl to an outlet at a top of the bowl. The electronic components should preferably be aligned to a specific orientation before they are delivered to the outlet of the bowl. A conventional approach is to discard electronic components with incorrect orientations by generating a rejection signal using a sorting sensor and then returning incorrectly-oriented electronic components back to the bottom of the container for recycling. However, the result is that fewer electronic components will be delivered to the outlet of the bowl and this approach yields a lower feed rate and efficiency. The vibratory bowl needs to speed up considerably to compensate for those electronic components which have to be recycled through such rejection by generating a higher vibration level. Disadvantageously, a higher vibration level will lead to component bouncing that also limits the feeding speed due to electronic components having shorter contact times with the chute grooves.

The conventional approach has further limitations in relation to electronic components which have unique orientations and need many passes of orientation checking and rejection. The number of correctly-oriented components delivered to the bowl outlet will be decreased significantly. For such applications, double or even more helical grooves, rejection and merge systems are necessary, such that the bowl container design becomes more sophisticated and difficult for fabrication and set-up.

In U.S. Pat. No. 6,513,644 entitled "Apparatus and Method for Aligning Parts", a part-holding chamber has an arc-shaped chute groove for orienting electronic components in a given direction and a gate port which allows electronic components in a correct orientation to pass through in a single line. A rotary impeller having blades is mounted to urge any electronic components at the gate port that are in an incorrect orientation away from the direction in which electronic components are discharged to prevent clogging. However, a limitation of this design is that the electronic components have to be symmetrical in shape without requiring top and bottom orientation or arrangement in order to be aligned by the part-holding chamber.

Moreover, in U.S. Pat. No. 7,810,632 entitled "Vibratory Conveying Apparatus", the apparatus as described therein sorts out and rejects electronic components with incorrect orientations but does not attempt to change the orientations of the components during sorting. The efficiency of the apparatus is thus low with many of the electronic components being automatically rejected, and the feed rate is limited.

SUMMARY OF THE INVENTION

Thus, it is an object of the invention to seek to provide an apparatus and method for automatically orienting and sorting electronic components with higher efficiency and feed rate when compared to the prior art.

According to a first aspect of the invention, there is provided a vibration feeding apparatus comprising: an alignment track that is operative to receive electronic components and to arrange the electronic components in a desired orientation by vibrating and accelerating the electronic components located on the alignment track; an inspection station operative to reject electronic components that are not in the desired orientation onto a reject track for reintroduction to the alignment track; and a spreading unit adjacent to the alignment track for transferring rejected electronic components from the reject track to the alignment track for arranging the electronic components in the desired orientation.

According to a second aspect of the invention, there is provided a method of feeding electronic components in a desired orientation, comprising the steps of: introducing electronic components onto an alignment track; vibrating the alignment track to accelerate and arrange the electronic components in the desired orientation on the alignment track; determining at an inspection station whether each of the electronic components is in the desired orientation; and rejecting electronic components that are not in the desired orientation onto a reject track and thereafter reintroducing the rejected electronic components via a spreading unit onto the alignment track for arranging the electronic components in the desired orientation.

It would be convenient hereinafter to describe the invention in greater detail by reference to the accompanying drawings which illustrate one preferred embodiment of the invention. The particularity of the drawings and the related description is not to be understood as superseding the generality of the broad identification of the invention as defined by the claims.

BRIEF DESCRIPTION OF THE DRAWINGS

The present invention will be readily appreciated by reference to the detailed description of the preferred embodiment of the invention when considered with the accompanying drawings, in which.

DETAILED DESCRIPTION OF THE PREFERRED EMBODIMENT OF THE INVENTION

Figure 1:
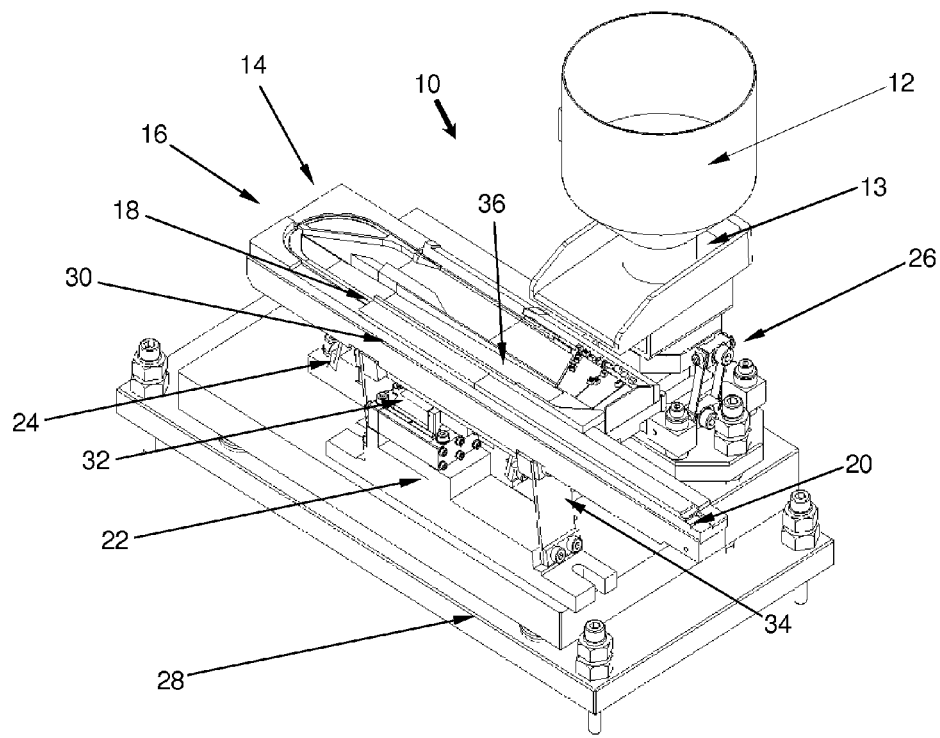
FIG. 1 is an isometric view of a vibration feeding apparatus according to the preferred embodiment of the invention.

FIG. 1 is an isometric view of a vibration feeding apparatus 10 according to the preferred embodiment of the invention. It comprises a number of mechanical modules, including a hopper container 12, a feeding tray 13, an alignment track 14, a sorting track 16, linear vibrator modules 22, 24, 26 for exciting the alignment and sorting tracks 14, 16 to vibrate, and a vibration isolation platform 28.

The linear vibrator modules 22, 24, 26 generally excite the tracks 14, 16 to vibrate with a single frequency, and comprise a movable block 30 that transmits vibratory motion to the tracks, an actuator in the form of an electromagnetic linear motor 32 that provides excitation forces to the movable block 30, as well as a spring 34 which is connected to a spring-mass system that determines a vibration frequency of the linear vibrator modules 22, 24, 26 and a conveyance direction. Forces generated by the electromagnetic linear motor 32 accelerate the tracks 14, 16 to vibrate and the electronic components placed on the tracks to vibrate and experience acceleration. The resultant acceleration has both vertical and horizontal components. When the vertical acceleration field is slightly larger than the gravitational field, the objects are lifted off the track surface and are simultaneously projected forward due to the horizontal acceleration component.

In the preferred embodiment, the tracks 14, 16 are mass-tuned to operate at resonance. Whilst the alignment track 14 is actively driven, the sorting track 16 is passively driven, such that a single actuator in the form of the electromagnetic linear motor 32 is operable to drive both tracks.

During operation of the vibration feeding apparatus 10, electronic components are fed in bulk into the hopper container 12 and the electronic components drop onto the feeding tray 13. The electronic components are then progressively fed to the alignment track 14, which vibrates due to actuation by the linear vibrator modules 22, 24, 26. The controlled vibration motion of the alignment track 14 conveys the electronic components linearly in a single line along the alignment track 14 towards the sorting track 16 which connects the alignment track to a track exit 20. Sensors (such as an overflow sensor 18 along the sorting track 16) determine whether each electronic component is in a desired orientation and whether there is congestion of electronic components potentially causing an overflow. Incorrectly oriented electronic components or overflow electronic components are rejected and expelled onto a reject track 36 and are then reintroduced onto the alignment track 14 for repeating the sorting process. Correctly oriented electronic components in the desired orientation are moved to a downstream apparatus such as a pick-and-place machine via the track exit 20 for further processing.

Figure 2:
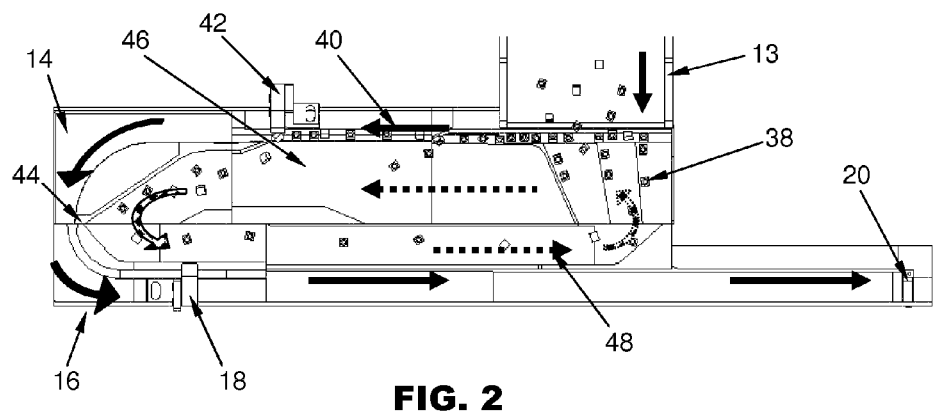
FIG. 2 is a plan view of the vibration feeding apparatus illustrating its feeding paths.

FIG. 2 is a plan view of the vibration feeding apparatus 10 illustrating its feeding paths. Electronic components 38 that drop onto the feeding tray 13 are progressively introduced from the feeding tray 13 to the alignment track 14 and are arranged and conveyed in a single line along a main path 40 towards the end of the alignment track 14.

An inspection sensor 42 at an inspection station located along the main path 40 of the alignment track 14 determines whether each electronic component 38 is in a correct orientation. Incorrectly-oriented electronic components 38 identified by the inspection sensor 42 are ejected using an air jet which is also located at the inspection station and are returned to an overflow region 46 of the reject track 36. Electronic components 38 that are in the correct orientation proceed to the sorting track 16 via a curved junction 44 along which the electronic components 38 are conveyed.

An overflow sensor 18 at an overflow station detects any excess electronic components 38 that have accumulated on the sorting track 16 and excess electronic components 38 are ejected by an air jet located at the overflow station into the overflow region 46 to prevent buffer overflow from occurring. Other electronic components 38 proceed along the sorting track 16 and advance to a buffer region between the overflow sensor 18 and the track exit 20. Since they are already arranged in the desired orientation, they are ready to leave the vibration feeding apparatus 10 from the track exit 20. Electronic components 38 that have been ejected into the overflow region 46 are moved along a return path 48 on the reject track 36 towards the start of the alignment track 14 to undergo the orientation and sorting process again.

Figure 3:
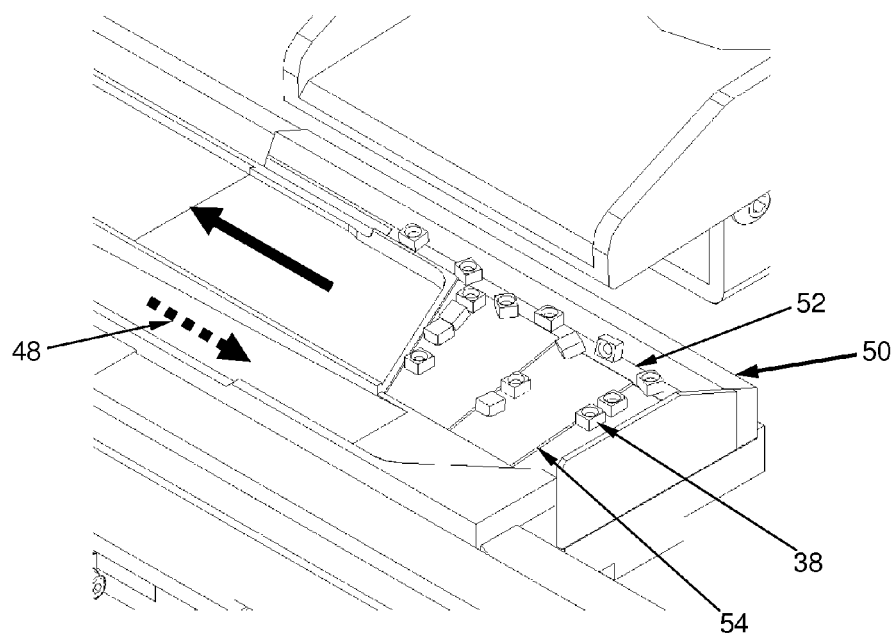
FIG. 3 is an isometric view of a spreading unit of the vibration feeding apparatus.

FIG. 3 is an isometric view of a spreading unit 50 of the vibration feeding apparatus 10. The spreading unit 50 is located adjacent to a U-shaped groove 52 of the alignment track 14 which has a U-shaped cross-section, and generally comprises a series of hatched steps 54 adjacent to the U-shaped groove 52.

Figure 4:
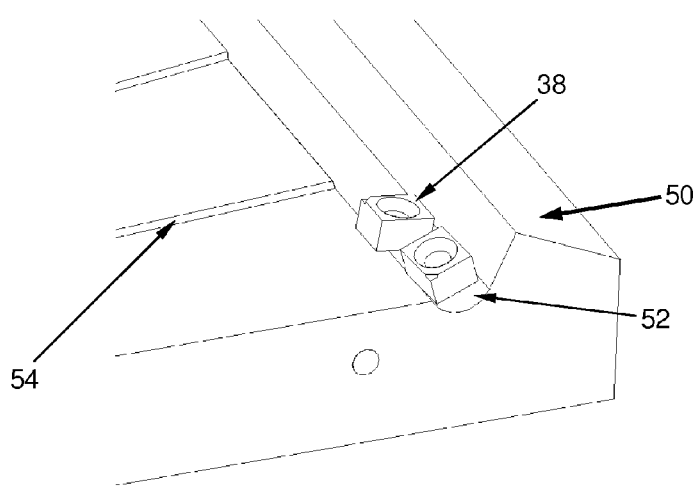
FIG. 4 is a close-up view of a U-shaped groove design and hatched steps of the spreading unit.

FIG. 4 is a close-up view of the U-shaped groove 52 design and the hatched steps 54 of the spreading unit 50. The spreading unit 50 transfers rejected electronic components 38 from the reject track 36 to the alignment track 14 for arranging the electronic components 38 in the desired orientation. Electronic components 38 are conveyed along the reject track 36 by vibratory movement of the movable block 30 and then fall into the U-shaped groove 52 as they are guided by the hatched steps 54 adjacent to the alignment track 14. Each hatched step 54 is separated from another hatched step by a raised edge which extends from the alignment track 14 at an angle. The U-shaped groove 52 is configured to receive and to arrange the electronic components 38.

Figure 5:
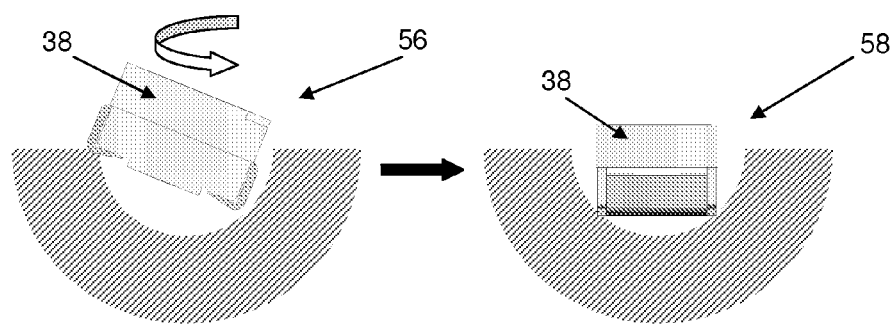
FIG. 5 is a side view of the U-shaped groove illustrating a self-alignment and orientation method according to the preferred embodiment of the invention.

FIG. 5 is a side view of a U-shaped groove 52 illustrating a self-alignment and orientation method according to the preferred embodiment of the invention. The electronic components bounce inside the U-shaped groove 52 due to vibratory motion of the alignment track 14. The U-shaped groove 52 is shaped such that it generally has two contact points for supporting cuboidal or rectangular-shaped electronic components 38 which are oriented perpendicularly to a moving direction 56. The electronic components 38 are configured to move towards their equilibrium positions when they are in their unstable states as they are being vibrated. Due to gravity, the electronic components 38 fall naturally into lower positions of the U-shaped groove 52 and automatically rest at an equilibrium orientation 58 with two line contacts, which would also be the desired orientation. The electronic components 38 are conveyed faster in the U-shaped groove 52 due to increased frictional force by virtue of the increased contact surfaces due to curvature of the U-shaped groove 52. More room is available for adjacent electronic components 38 to continuously repeat the orientation correction process.

Figure 6:
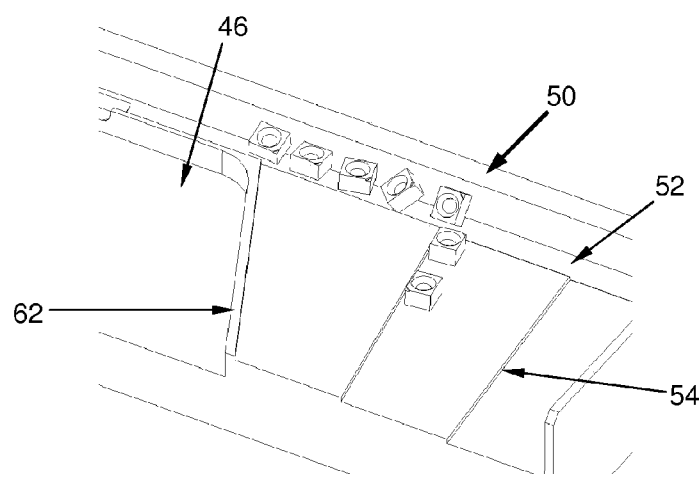
FIG. 6 illustrates a supply rate regulation gate for electronic components moving from the hatched steps to the U-shaped groove.

FIG. 6 illustrates a supply rate regulation gate 62 for electronic components 38 moving from the hatched steps 54 to the U-shaped groove 52. The supply rate regulation gate 62 separates the overflow region 46 of the reject track 36 from the hatched steps 54. It helps to regulate the supply of electronic components 38 to the U-shaped groove 52 or the recycling of excess electronic components 38 onto the overflow region 46.

The spreading unit 50 is primarily designed to provide a steady rate of supply of electronic components 38 to carry out orientation correction and alignment. The electronic components 38 are configured to move towards the U-shaped groove 52 as guided by the hatched steps 54. More electronic components 38 falling into the U-shaped groove 52 increases alignment efficiency by reducing empty space and thus ensures that more correctly-oriented electronic components 38 enter the vibration feeding apparatus 10 to yield a higher rate of conveyance.

Figure 7:
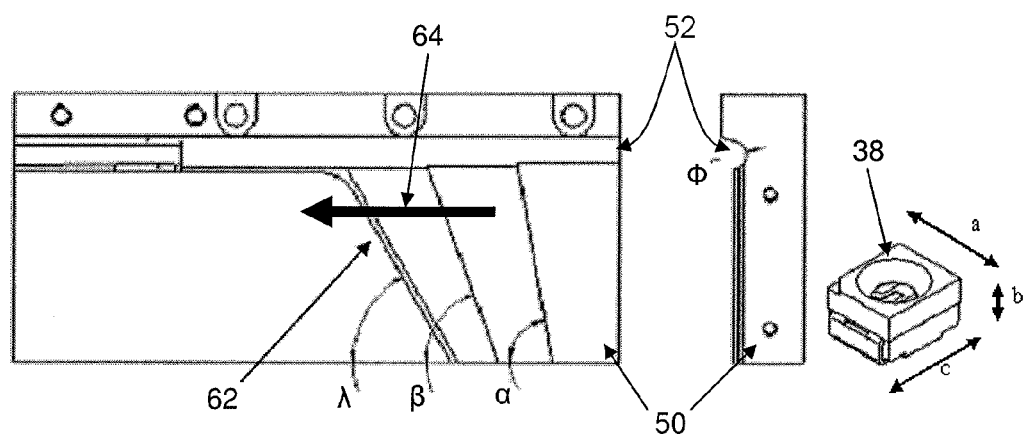
FIG. 7 highlights certain important dimensions of the spreading unit and U-shaped groove designs respectively.

In order to regulate the orientation alignment and rate of conveyance of the electronic components 38, there are certain dimensions of the spreading unit 50 which are designed to match the geometry and weight of the electronic components 38. FIG. 7 highlights certain important dimensions of the spreading unit 50 and U-shaped groove 52 designs respectively. For instance, a radius $\phi$ of the U-shaped groove 52 should be approximately 1.2-1.3 times of a length of the electronic component 38 and the aspect ratio of the length, width and height respectively of the electronic component 38 (a:b:c) should be greater than 1:1:1.2.

Angles of the raised edges extending from the alignment track 14 separating the hatched steps 54 relative to the U-shaped groove 52 should increase in a general direction of travel 64 of electronic components 38 along the spreading unit 50, such that $\alpha > \beta > \lambda$ (see FIG. 6). This is in order to allow the conveyance speed of electronic components 38 to increase gradually in the said general direction of travel 64 to avoid jamming and overcrowding of electronic components 38 which might constrain their free rotational movement. Once the U-shaped groove 52 has been filled up, excess electronic components 38 are moved one step up the hatched steps 54 and may await empty spaces downstream of the U-shaped groove 52 to fill up such empty spaces. When the electronic components 38 reach the supply rate regulation gate 62, excess electronic components 38 will fall into the overflow region 46 of the reject track 36 adjacent to it and are recycled via the return path 48 to prevent overcrowding of electronic components 38 at the spreading unit 50. As previously mentioned, overcrowding may slow down the free rotation and alignment of the electronic components 38, which may in turn cause jamming to occur.

The invention described herein is susceptible to variations, modifications and/or additions other than those specifically described and it is to be understood that the invention includes all such variations, modifications and/or additions which fall within the spirit and scope of the above description.

The invention claimed is:

1. A vibration feeding apparatus comprising:
   an alignment track that is operative to receive electronic components and to arrange the electronic components in a desired orientation by vibrating and accelerating the electronic components located on the alignment track;
   an inspection station operative to reject electronic components that are not in the desired orientation onto a reject track for reintroduction to the alignment track; and
   a spreading unit adjacent to the alignment track for transferring rejected electronic components from the reject track to the alignment track for arranging the electronic components in the desired orientation;
   wherein the spreading unit comprises a plurality of hatched steps adjacent to the alignment track, each hatched step being separated from another hatched step by a raised edge which extends from the alignment track at an angle.

2. The vibration feeding apparatus as claimed in claim 1, wherein the alignment track further comprises a groove having a U-shaped cross-section which is configured to receive and arrange the electronic components.

3. The vibration feeding apparatus as claimed in claim 2, wherein the groove is shaped such that it has generally two contact points for supporting cuboidal or rectangular-shaped electronic components, and the electronic components are configured to automatically rest at the desired orientation at their equilibrium positions as supported by the groove.

4. The vibration feeding apparatus as claimed in claim 2, wherein a radius of the groove is 1.2 to 1.3 times a length of each electronic component.

5. The vibration feeding apparatus as claimed in claim 2, wherein an aspect ratio of a length, width and height respectively of each electronic component is greater than 1:1:1.2.

6. The vibration feeding apparatus as claimed in claim 1, wherein the electronic components are conveyed linearly along the alignment track in a single line.

7. The vibration feeding apparatus as claimed in claim 1, wherein the inspection station comprises an inspection sensor for determining whether each electrical component is in the desired orientation and an air jet operative to eject electronic components which are not in the desired orientation onto the reject track.

8. The vibration feeding apparatus as claimed in claim 1, further comprising a sorting track having a buffer region which connects the alignment track to a track exit where electronic components which are in the desired orientation are moved.

9. The vibration feeding apparatus as claimed in claim 8, further comprising an overflow station located at the sorting track for detecting a presence of excess electronic components and for ejecting excess electronic components onto the reject track to prevent overflow.

10. The vibration feeding apparatus as claimed in claim 8, further comprising a curved junction connecting the alignment track to the sorting track along which the electronic components are configured to be conveyed.

11. The vibration feeding apparatus as claimed in claim 1, further comprising a supply rate regulation gate separating the reject track from the hatched steps, wherein excess electronic components not received by the alignment track from the spreading unit are channeled past the supply rate regulation gate to the reject track for reintroduction to the alignment track.

12. The vibration feeding apparatus as claimed in claim 1, wherein respective angles of each of the raised edges extending from the alignment track increase relative to the alignment track in a general direction of travel of the electronic components along the spreading unit so as to gradually increase a conveyance speed of the electronic components in the said direction of travel.

13. The vibration feeding apparatus as claimed in claim 1, wherein the spreading unit is configured and operative to transfer rejected electronic components from the reject track directly to the alignment track for arranging the electronic components in the desired orientation.

14. A method of feeding electronic components in a desired orientation, comprising the steps of:
- introducing electronic components onto an alignment track;
- vibrating and accelerating the electronic components on the alignment track to arrange the electronic components in the desired orientation on the alignment track;
- determining at an inspection station whether each of the electronic components is in the desired orientation; and
- rejecting, by the inspection station, electronic components that are not in the desired orientation onto a reject track and thereafter reintroducing the rejected electronic components, via a spreading unit, from the reject track onto the alignment track for arranging the electronic components in the desired orientation,
- wherein the spreading unit is adjacent to the alignment track, and the spreading unit comprises a plurality of hatched steps adjacent to the alignment track, each hatched step being separated from another hatched step by a raised edge which extends from the alignment track at an angle.

15. The method of feeding electronic components as claimed in claim 14, wherein the alignment track comprises a groove having a U-shaped cross-section which is configured to receive and arrange the electronic components.

16. The method of feeding electronic components as claimed in claim 14, wherein the electronic components are conveyed linearly along the alignment track in a single line.

17. The method of feeding electronic components as claimed in claim 14, further comprising the step of ejecting electronic components which are not in the desired orientation onto the reject track with an air jet.

18. The method of feeding electronic components as claimed in claim 14, further comprising the step of detecting a presence of excess electronic components at an overflow station and ejecting excess electronic components onto the reject track to prevent overflow.

19. The method of feeding electronic components as claimed in claim 14, further comprising the step of channeling excess electronic components at the spreading unit which are not received by the alignment track to the reject track for reintroduction to the alignment track.

20. The method of feeding electronic components as claimed in claim 14, further comprising the step of gradually increasing a conveyance speed of the electronic components in a general direction of travel of the electronic components along the spreading unit when they are moving in the direction of travel.

* * * * *